United States Patent
Hong et al.

(10) Patent No.: US 9,338,790 B2
(45) Date of Patent: May 10, 2016

(54) SYSTEM AND METHOD FOR RANDOM ACCESS WIRELESS COMMUNICATION

(71) Applicant: Electronics and Telecommunications Research Institute, Daejeon (KR)

(72) Inventors: Tae Chul Hong, Seoul (KR); Hee Wook Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 129 days.

(21) Appl. No.: 14/079,056

(22) Filed: Nov. 13, 2013

(65) Prior Publication Data

US 2014/0133475 A1    May 15, 2014

(30) Foreign Application Priority Data

Nov. 14, 2012 (KR) .................. 10-2012-0128974

(51) Int. Cl.
*H04W 72/12* (2009.01)
*H04W 72/04* (2009.01)
*H04W 84/12* (2009.01)
*H04W 74/08* (2009.01)

(52) U.S. Cl.
CPC ........ *H04W 72/121* (2013.01); *H04W 72/0446* (2013.01); *H04W 72/12* (2013.01); *H04W 72/042* (2013.01); *H04W 72/0413* (2013.01); *H04W 74/0833* (2013.01); *H04W 84/12* (2013.01)

(58) Field of Classification Search
CPC .................................................. H04W 72/12
USPC ......... 370/252, 281, 328, 329, 332, 336, 338, 370/350; 455/440, 456.1, 456.2
See application file for complete search history.

(56) References Cited

U.S. PATENT DOCUMENTS

| | | | | |
|---|---|---|---|---|
| 5,987,338 A * | 11/1999 | Gibbons et al. | ............... | 455/574 |
| 6,122,512 A * | 9/2000 | Bodin | ........................ | G01S 5/14 |
| | | | | 455/436 |
| 6,347,091 B1 * | 2/2002 | Wallentin et al. | ............. | 370/437 |
| 6,437,743 B1 * | 8/2002 | Mintz | ..................... | G01S 5/0027 |
| | | | | 342/457 |
| 6,633,559 B1 * | 10/2003 | Asokan | ................ | H04B 7/2656 |
| | | | | 370/252 |
| 6,701,132 B1 * | 3/2004 | Fukuzawa | ................. | G01S 5/10 |
| | | | | 455/561 |
| 6,934,249 B1 * | 8/2005 | Bertin et al. | ................... | 370/218 |
| 7,068,746 B1 * | 6/2006 | Stichter | ...................... | 375/356 |
| 7,339,906 B1 * | 3/2008 | Dahlby | ................ | H04W 76/02 |
| | | | | 370/329 |
| 7,606,938 B2 * | 10/2009 | Roese | ....................... | G01S 5/02 |
| | | | | 455/456.1 |

(Continued)

FOREIGN PATENT DOCUMENTS

| | | |
|---|---|---|
| KR | 10-2008-0015349 | 2/2008 |
| KR | 10-2008-0015355 | 2/2008 |

(Continued)

*Primary Examiner* — Andrew Lai
*Assistant Examiner* — Andrew C Lee
(74) *Attorney, Agent, or Firm* — Kile Park Reed & Houtteman PLLC

(57) ABSTRACT

A system and method for wireless communication that schedules a connection time of a terminal based on a delay time is provided. A base station of the system for wireless communication may include a delay time determiner to determine a delay time of a terminal, based on preamble information for a plurality of terminal groups based on location information of the terminal, and a scheduler to schedule a connection time for the terminal to connect to the base station, using the delay time.

18 Claims, 8 Drawing Sheets

(56) References Cited

U.S. PATENT DOCUMENTS

| | | | | |
|---|---|---|---|---|
| 7,843,815 B2 * | 11/2010 | Znamova | | H04J 3/0682 370/229 |
| 7,885,673 B2 * | 2/2011 | Brunel | | H04L 27/2607 370/508 |
| 8,059,557 B1 * | 11/2011 | Sigg | | H04W 28/16 370/252 |
| 8,280,421 B2 * | 10/2012 | Nanri | | H04L 1/0001 455/458 |
| 8,411,664 B2 * | 4/2013 | Tynderfeldt | | H04W 56/0005 370/350 |
| 8,718,482 B1 * | 5/2014 | Roberts et al. | | 398/161 |
| 2003/0103475 A1 * | 6/2003 | Heppe | | H04B 7/2681 370/321 |
| 2003/0216143 A1 * | 11/2003 | Roese et al. | | 455/456.1 |
| 2005/0157694 A1 * | 7/2005 | Lu | | H04J 3/1694 370/345 |
| 2005/0159914 A1 * | 7/2005 | Sunden et al. | | 702/125 |
| 2006/0073828 A1 * | 4/2006 | Sipila | | H04W 36/12 455/436 |
| 2007/0019667 A1 * | 1/2007 | Mottier | | H04B 7/2643 370/458 |
| 2008/0095198 A1 * | 4/2008 | Wager et al. | | 370/519 |
| 2009/0225701 A1 * | 9/2009 | Kwon | | H04L 1/0006 370/328 |
| 2010/0034141 A1 | 2/2010 | Meylan | | |
| 2010/0035541 A1 * | 2/2010 | Kim et al. | | 455/9 |
| 2010/0067467 A1 * | 3/2010 | Cho et al. | | 370/329 |
| 2010/0172262 A1 * | 7/2010 | Ko et al. | | 370/252 |
| 2010/0190509 A1 * | 7/2010 | Davis | | H04W 56/006 455/456.1 |
| 2011/0199945 A1 * | 8/2011 | Chang | | H04W 52/241 370/281 |
| 2011/0205964 A1 * | 8/2011 | Fix | | G01S 5/0252 370/328 |
| 2011/0261891 A1 * | 10/2011 | Vos et al. | | 375/259 |
| 2011/0269478 A1 * | 11/2011 | Das et al. | | 455/456.1 |
| 2012/0258730 A1 * | 10/2012 | Tinnakornsrisuphap et al. | | 455/456.1 |
| 2013/0021199 A1 * | 1/2013 | Fix | | G01S 5/0263 342/357.43 |
| 2013/0072230 A1 * | 3/2013 | Bansal | | H04W 4/02 455/456.2 |

FOREIGN PATENT DOCUMENTS

| | | |
|---|---|---|
| KR | 10-2008-0023413 | 3/2008 |
| KR | 10-2010-0071687 | 6/2010 |
| KR | 10-2012-0025392 | 3/2012 |

* cited by examiner

SYSTEM AND METHOD FOR RANDOM ACCESS WIRELESS COMMUNICATION

CROSS-REFERENCE TO RELATED APPLICATION

This application claims the priority benefit of Korean Patent Application No. 10-2012-0128974, filed on Nov. 14, 2012, in the Korean Intellectual Property Office, the disclosure of which is incorporated herein by reference.

BACKGROUND

1. Field of the Invention

The present invention relates to a system and method for random access wireless communication, and more particularly, to a system and method for wireless communication that schedules a connection time of a terminal based on a delay time occurring related to a distance between the terminal and a base station during wireless communication.

The present invention is based on research conducted as part of broadcasting and communications infrastructure fundamental technology development project of Korea Communications Commission. [Project reference number: KCA-2012-911-01-201,]

2. Description of the Related Art

A method for random access in a mobile communication system may use a slotted aloha scheme.

The slotted aloha scheme may refer to a scheme in which a time axis is divided into slots, and a terminal attempts random access in a portion in which a slot commences. Also, the slotted aloha scheme may settle a random access competition issue, through transmitting an acknowledgement (ACK) message when a base station successfully receives the random access attempt of the terminal, and otherwise transmitting a negative-acknowledgement (NACK) message.

The method for random access in the mobile communication system may establish a random access slot length and a random access preamble, based on a cell size, for example, a maximum distance between a base station and a terminal.

However, a communication system requiring a cell size as great as a satellite communication system may have a longer random access slot length than a random access slot length of another mobile communication system because a gap of a delay time occurring during communication between the terminal and the base station is great in the communication system requiring such a great cell size.

In this instance, when the random access slot length increases, a number of terminals to connect to per unit time may decrease.

Accordingly, there is a need for a method for performing random access without increasing the random access slot length in the communication system requiring the cell size as great as the satellite communication system.

SUMMARY

An aspect of the present invention provides an apparatus and method for compensating for an occurrence of a longer period of delay time than a random access slot length through a base station scheduling a connection time of a terminal based on delay time information of the terminal.

According to an aspect of the present invention, there is provided a base station including a delay time determiner to determine a delay time of a terminal, using preamble information for a plurality of terminal groups based on information associated with a terminal location, and a scheduler to schedule a connection time for the terminal to connect to a base station, using the delay time.

The scheduler may set differing durations of time occupied by communication resources corresponding to the terminal, based on a terminal group including the terminal, and schedule a connection time for the terminal.

The scheduler may set, in proportion to the delay time, a duration of time occupied by communication resources corresponding to a terminal.

The scheduler may allocate identical communication resources to a plurality of terminals for which respective delay times differ from one another.

According to an aspect of the present invention, there is provided a terminal including a preamble information selector to select preamble information, using information associated with a terminal location, and a transceiver to transmit the preamble information to a base station, and receive scheduling information corresponding to the preamble information from the base station.

The preamble information selector may determine a terminal group corresponding to a terminal, using the information on the terminal location, and selects preamble information corresponding to the terminal group.

The preamble information selector may identify a delay time occurring during communication between a terminal and a base station, using a distance between the terminal and the base station based on the information associated with the terminal location, and identifies a terminal group corresponding to a terminal based on the delay time.

The transceiver may perform wireless communication through connecting to the base station, based on the scheduling information.

According to an aspect of the present invention, there is provided a method for wireless communication, the method including determining a delay time of a terminal, using preamble information for a plurality of terminal groups based on information associated with a terminal location, and scheduling a connection time for the terminal to connect to a base station, using the delay time.

According to an aspect of the present invention, there is provided a method for wireless communication, the method including selecting preamble information, using information on a terminal location, and transmitting the preamble information, and receiving scheduling information corresponding to the preamble information from the base station.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
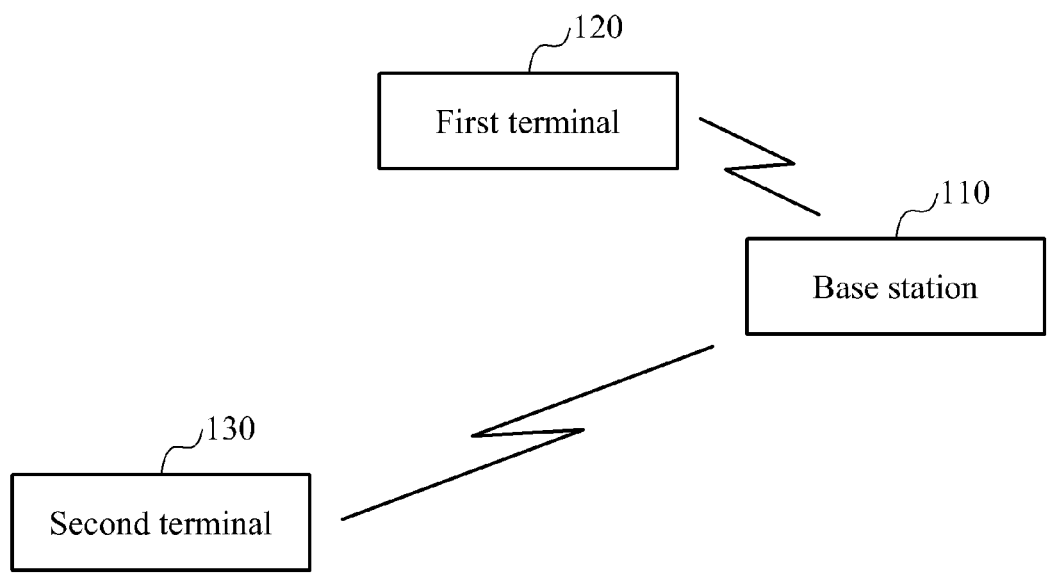
FIG. 1 is a diagram illustrating a system for wireless communication according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a system for wireless communication according to an embodiment of the present invention.

Referring to FIG. 1, the system for wireless communication may include at least one terminal and a base station 110.

The system for wireless communication may schedule a random access connection time of a terminal, based on a gap of delay times occurring related to a distance between the terminal and the base station 110 during communication between the terminal and the base station 110 via random access. Here, the system for wireless communication may refer to a system for wireless communication performing wireless communication in a method for random access.

For example, a first terminal 120 may perform wireless communication with the base station 110 without a delay time. When a second terminal 130 of which a distance to the base station 110 is farther than a distance of the first terminal 120 to the base station 110 performs wireless communication with the base station 110, a predetermined duration of delay time may occur.

Accordingly, the base station 110 may receive preamble information based on information associated with a terminal location from the terminal, and determine a delay time of the terminal based on the received preamble information. In this instance, the preamble information may refer to a random access preamble code.

The system for wireless communication may group terminals based on an occurrence of a delay time, or a length of the delay time, and establish the preamble information for a plurality of terminal groups. In this instance, the plurality of terminal groups may be divided based on a delay time in integer-multiples of a scheduling unit time. Here, when the system for wireless communication corresponds to a third generation partnership project long-term evolution (3GPP LTE) communication system, the scheduling time unit may be a length of a 1 millisecond (ms) sub-frame.

For example, the system for wireless communication may determine terminals without a delay time to be a first group, and terminals of which a delay time is 1 ms to be a second group. Also, the system for wireless communication may determine a third group, a fourth group, and so on, over a course of delay time in a sequential manner.

A relationship between a terminal location and the plurality of terminal groups will be discussed in detail with reference to FIG. 4.

The system for wireless communication may establish a number of the plurality of terminal groups, and a preamble code and a delay time value corresponding to the plurality of terminal groups, based on a cell size. For one example, when four terminal groups are established using 64 preamble codes in a single cell, the system for wireless communication may establish preamble information for the plurality of terminal groups as represented in Table 1.

TABLE 1

| Terminal group | Preamble information |
|---|---|
| First group | 1~16 |
| Second group | 17~32 |
| Third group | 33~48 |
| Fourth group | 49~64 |

In this instance, a terminal may identify preamble information corresponding to the terminal, based on information associated with a terminal location, and transmit the identified preamble information to the base station 110. In particular, the first terminal 120 may measure a distance from a location of the first terminal 120 to the base station 110, and identify a delay time corresponding to the measured distance. In an absence of the delay time, the first terminal 120 may determine that the first terminal 120 is included in the first group, and select and transmit, to the base station 110, one of random access preamble codes from 1 through 16, for example, preamble information corresponding to the first group.

Also, the second terminal 130 may measure a distance from a location of the second terminal 130 to the base station 110, and identify a delay time corresponding to the measured distance. When the delay time is 1 ms, the second terminal 130 may determine that the second terminal 130 is included in the second group, and select and transmit, to the base station 110, one of random access preamble codes from 17 through 32, for example, preamble information corresponding to the second group.

Here, the base station 110 may reflect, in scheduling, a delay time occurring when the plurality of terminals 120 and 130 performs wireless communication, through scheduling a connection time for the plurality of terminals to connect to the base station 110, using the determined delay time.

Figure 2:
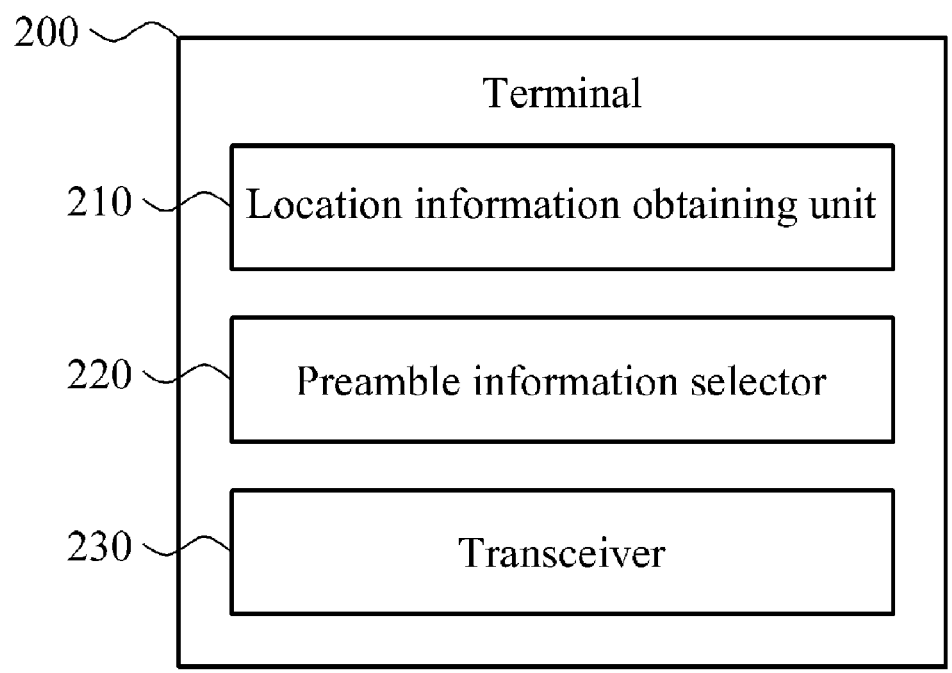
FIG. 2 is a diagram illustrating a terminal according to an embodiment of the present invention.

FIG. 2 is a diagram illustrating a terminal 200 according to an embodiment of the present invention.

Referring to FIG. 2, the terminal 200 may include a location information obtaining unit 210, a preamble information selector 220, and a transceiver 230.

The location information obtaining unit 210 may obtain location information of the terminal 200. For example, the location information obtaining unit 210 may obtain a global positioning system (GPS) coordinate of the terminal 200, using a GPS included in the terminal 200. Also, the location information obtaining unit 210 may request an additional location searching device to search for a location of the terminal 200 through a network, and receive the location information of the terminal 200 from the location searching device.

The preamble information selector 220 may select preamble information, based on the location information of the terminal 200 obtained by the location information obtaining unit 210.

Here, the preamble information selector 220 may identify a terminal group corresponding to the terminal 200, based on the location information of the terminal 200, and select a single piece of preamble information from among the preamble information corresponding to the identified terminal group.

More particularly, the preamble information selector 220 may identify a distance between the terminal 200 and the base station 110, using the location information of the terminal 200, and based on the identified distance between the terminal 200 and the base station 110, identify a delay time occurring during communication between the terminal 200 and the base station 110. The preamble information selector 220 may identify the terminal group corresponding to the terminal 200, using the identified delay time.

The transceiver 230 may transmit the preamble information selected by the preamble information selector 220 to the base station 110, and receive, from the base station 110, scheduling information corresponding to the selected preamble information. Here, the scheduling information received by the transceiver 230 may refer to scheduling information related to the delay time occurring during the communication between the terminal 200 and the base station 110.

The transceiver 230 may perform wireless communication through connecting to the base station 110, based on the received scheduling information.

Figure 3:
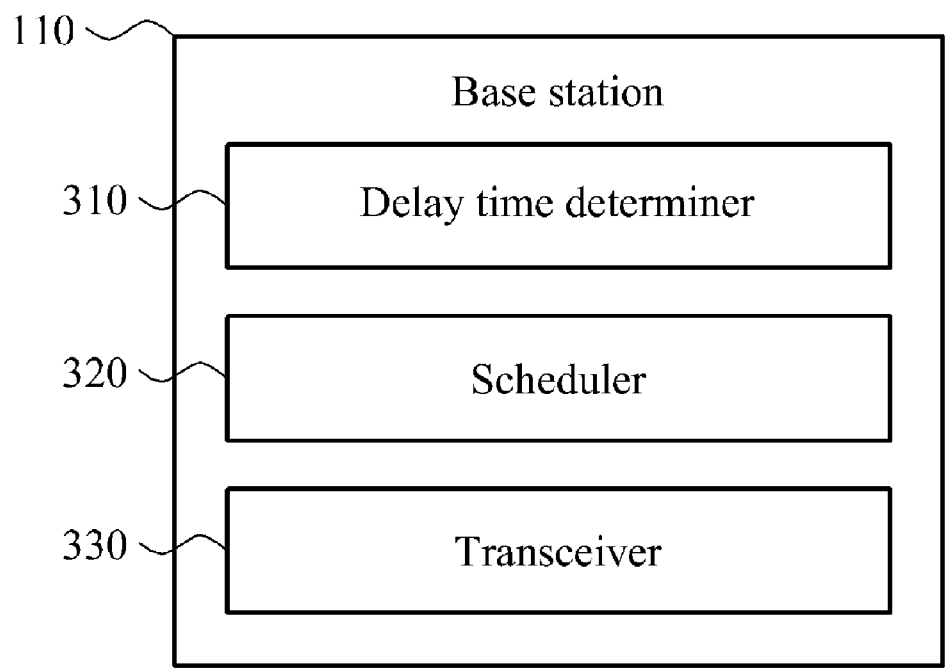
FIG. 3 is a diagram illustrating a base station according to an embodiment of the present invention.

FIG. 3 is a diagram illustrating a base station according to an embodiment of the present invention.

Referring to FIG. 3, the base station 110 may include a delay time determiner 310, a scheduler 320, and a transceiver 330.

The delay time determiner 310 may determine a delay time of a terminal, using preamble information received by the transceiver 330 from the terminal 200. Here, the preamble information received from the terminal 200 may refer to preamble information for a plurality of terminal groups, based on location information of the terminal 200.

More particularly, the delay time determiner 310 may identify a terminal group corresponding to the preamble information received from the terminal 200, and identify a delay time corresponding to the identified terminal group.

For example, when the preamble information for the plurality of terminal groups is established as shown in Table 1, and the transceiver 330 receives one of random access preamble codes from 1 through 16 as preamble information, the delay time determiner 310 may determine a delay time to be "0".

Also, when the preamble information for the plurality of terminal groups is established as shown in Table 1, and the transceiver 330 receives one of random access preamble codes from 17 through 32 as preamble information, the delay time determiner 310 may determine a delay time to be 1 ms.

The scheduler 320 may schedule a connection time for the terminal 200 to connect to the base station 110, using the delay time determined by the delay time determiner 310.

Here, the scheduler 320 may schedule the connection time of the terminal 200 through setting differing durations of time occupied by communication resources corresponding to the terminal 200, based on a terminal group including the terminal 200.

For example, the scheduler 320 may schedule a duration of time occupied by communication resources corresponding to a terminal included in a first group, a duration of time occupied by communication resources corresponding to a terminal included in a second group, a duration of time occupied by communication resources corresponding to a terminal included in a third group, and a duration of time occupied by communication resources corresponding to a terminal included in a fourth group differing from one another.

Here, the scheduler 320 may set, in proportion to a delay time, a duration of time occupied by communication resources corresponding to the terminal 200. For example, the scheduler 320 may set the duration of time occupied by communication resources corresponding to the terminal included in the second group to be subsequent to the duration of time occupied by communication resources corresponding to the terminal included in the first group. In particular, the scheduler 320 may set differing starting points of a duration of time in which the terminal 200 occupies communication resources based on a delay time when the scheduler 320 performs wireless communication with the terminal 200, and allow the terminal 200 to monopolize the communication resources occupied by delayed information during a time in which the delayed information uses the communication resources.

Also, the scheduler 320 may allocate identical communication resources to a plurality of terminals for which respective delay times differ from one another. For example, when preamble information is received from the terminal included in the first group and the terminal included in the second group, the scheduler 320 may allocate identical communication resources to the terminal included in the first group and the terminal included in the second group.

The transceiver 330 may receive preamble information from the terminal 200, and transmit scheduling information resulting from the scheduling by the scheduler 320 to the terminal 200.

Also, the transceiver 330 may perform wireless communication with the terminal 200 when the terminal 200 is connected based on the scheduling information.

Figure 4:
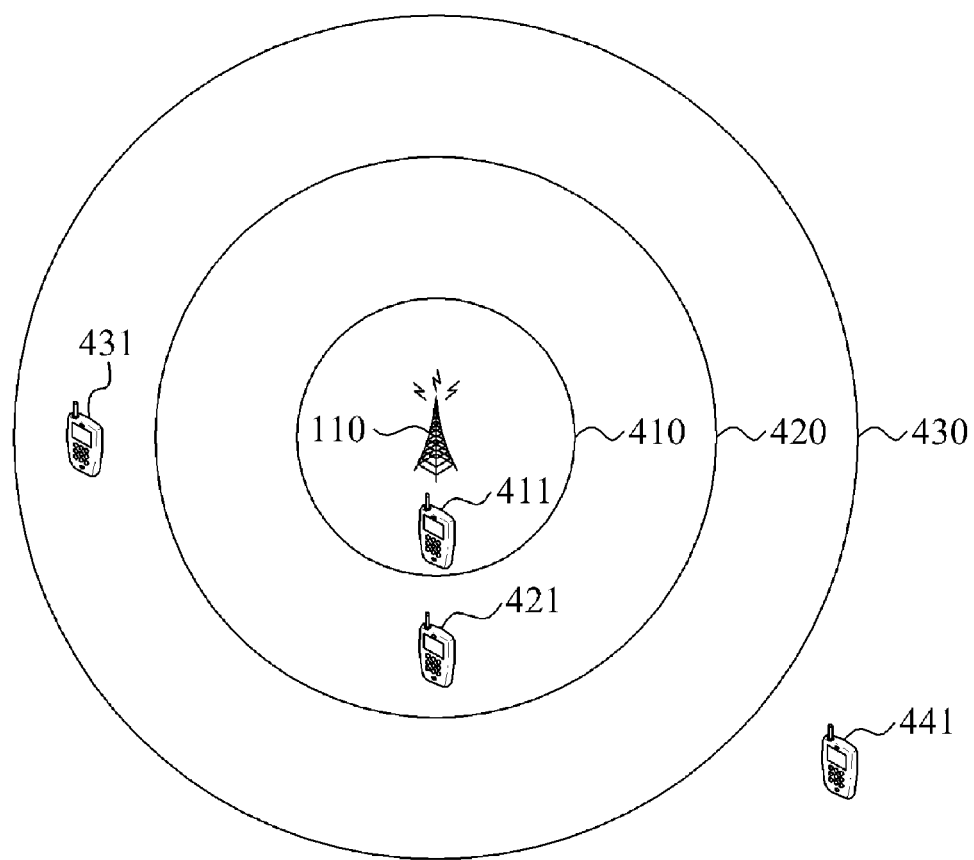
FIG. 4 is an example of terminal groups according to an embodiment of the present invention.

FIG. 4 is an example of a plurality of terminal groups 411, 421, 431, and 441 according to an embodiment of the present invention.

A system for wireless communication according to an embodiment of the present invention may group terminals based on an occurrence of a delay time, or a length of the delay time, and establish the plurality of terminal groups 411, 421, 431, and 441. Here, the greater a distance between a base station and a terminal, the greater the delay time. Accordingly, the plurality of terminal groups 411, 421, 431, and 441 may be determined based on the distance between the base station and the terminal.

More particularly, when the four terminals groups 411, 421, 431, and 441 are to be established, the system for wireless communication may determine a first critical distance 410, a second critical distance 420, and a third critical distance 430, based on the delay time.

The system for wireless communication may establish terminals 411 closer to the base station 110 than the first critical distance 410 to be a first group, of which a delay time is "0".

The system for wireless communication may establish terminals 421 disposed between the critical distance 410 and the second critical distance 420 to be a second group, of which a delay time is 1 ms.

The system for wireless communication may establish terminals 431 disposed between the second critical distance 420 and the third critical distance 430 to be a third group, of which a delay time is 2 ms.

The system for wireless communication may establish terminals 441 disposed more remote than the critical distance 430 to be a fourth group, of which a delay time is 3 ms.

Here, the scheduler 320 of the base station 110 may schedule the terminals 411 irrespective of the delay time. Also, the scheduler 320 may schedule the terminals 421 through applying the delay time of 1 ms, and the scheduler 320 may schedule the terminals 431 through applying the delay time of 2 ms. The scheduler 320 may schedule the terminals 441 through applying the delay time of 3 ms.

Figure 5:
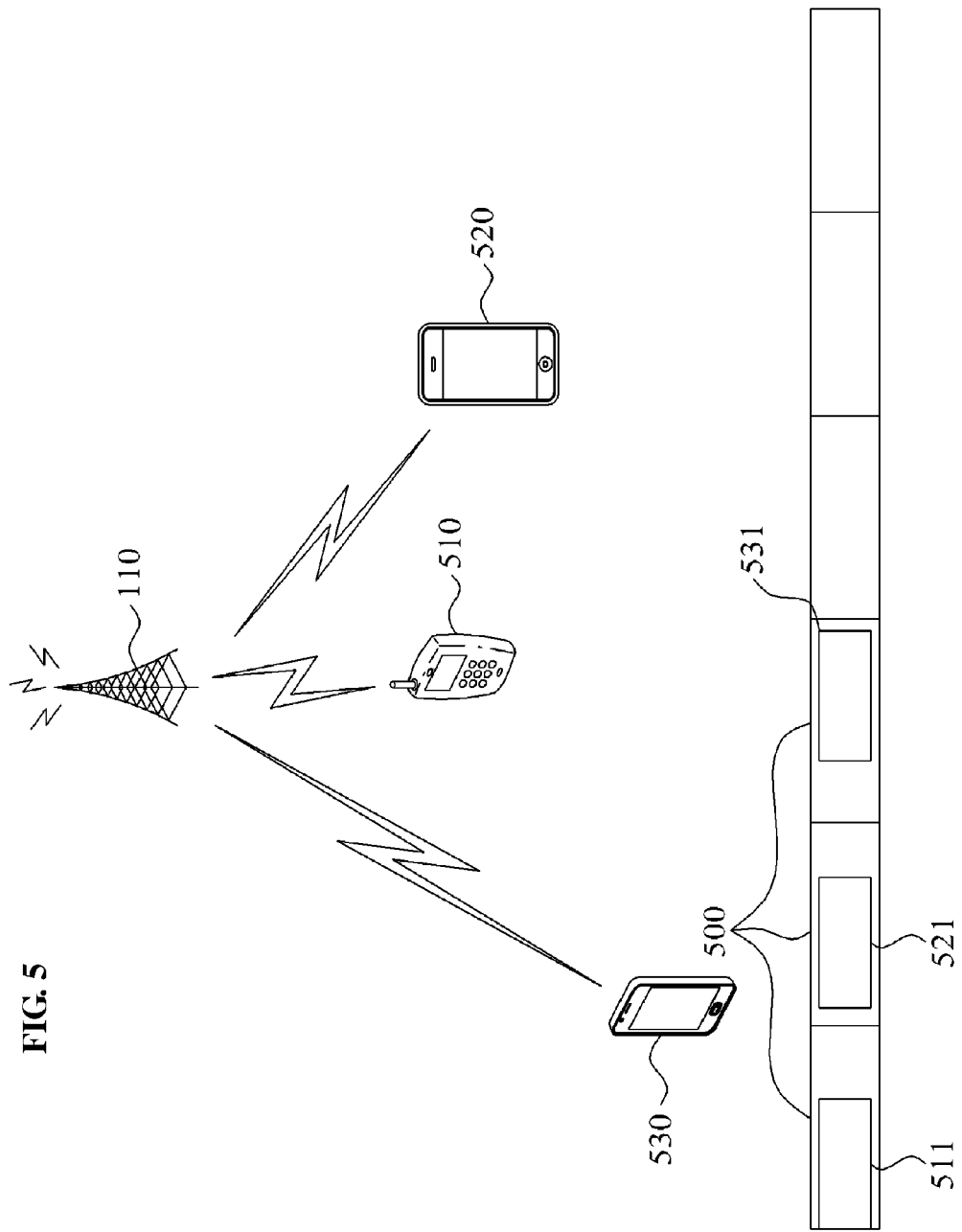
FIG. 5 is an example of a random access slot according to an embodiment of the present invention.

FIG. 5 is an example of a random access slot according to an embodiment of the present invention.

A system for wireless communication may correct a timing of a connection time of a terminal based on a delay time, and change a random access slot length to be shorter.

When the system for wireless communication is unable to correct the timing of the connection time of the terminal, the system for wireless communication may determine a random access slot length in order to receive from preamble transmission of a terminal absent a delay time to preamble transmission of a terminal having a longest delay time.

In particular, the random access slot length may increase because the random access slot length needs to be an added value of a period of time required for the preamble transmission and the longest delay time, and therefore a number of terminals to be connected to per unit time may decrease.

For example, a terminal 510, a terminal 520, and a terminal 530 may transmit preamble information to the base station 110. Here, the terminal 510 may be closest to the base station 110 absent a delay time, the terminal 520 may be more distant from the base station 110 than the terminal 510, and have a relatively short delay time, and the terminal 530 may be more distant from the base station 110 than the terminal 520, and have a relatively long delay time.

Here, in the system for wireless communication according to the embodiment of the present invention, the terminal 510 absent the delay time as shown in FIG. 5 may use a random access slot 511, the terminal 520 having the relatively short delay time may use a random access slot 521, and the terminal 530 having the relatively long delay time may use a random access slot 531.

In particular, the base station 110 may receive that the terminals 510 through 530 having differing delay times use different random access slots 511 through 531, respectively. Accordingly, a number of terminals for performing random access per unit time may increase because a number of random access slots allocated by the base station 110 during an identical duration of time increases.

Figure 6:
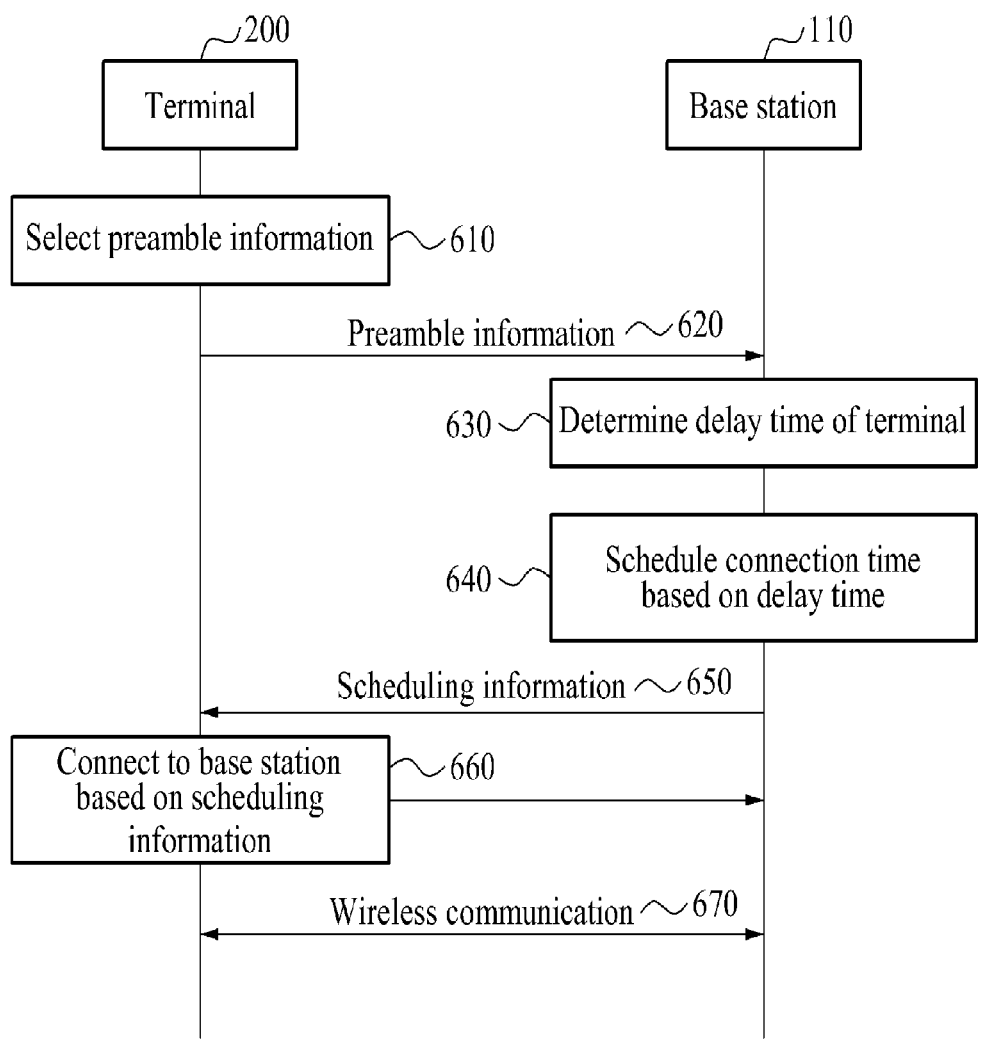
FIG. 6 is an example of an operation of a system for wireless communication according to an embodiment of the present invention.

FIG. 6 is an example of an operation of a system for wireless communication according to an embodiment of the present invention.

In operation 610, the terminal 200 may select preamble information, based on location information of the terminal 200. Here, the preamble information selector 220 may identify a terminal group corresponding to the terminal 200, based on the location information of the terminal 200, and select a single piece of preamble information from among preamble information corresponding to the terminal group.

In operation 620, the terminal 200 may transmit the preamble information selected in operation 610 to the base station 110.

In operation 630, the base station 110 may determine a delay time of the terminal 200, based on the preamble information received in operation 620. Here, the preamble information received from the terminal 200 may refer to preamble information for a plurality of terminals based on the location information of the terminal 200.

More particularly, the base station 110 may identify the terminal group corresponding to the preamble information received from the terminal 200, and identify a delay time corresponding to the identified terminal group.

For example, when the preamble information for the plurality of terminal groups is established as shown in Table 1, and when one of random access preamble codes from 1 through 16 is received as preamble information in operation 620, the base station 110 may determine a delay time to be "0".

Also, when the preamble information for the plurality of terminal groups may be established as shown in Table 1, and when one of random access preamble codes from 17 through 32 is received as preamble information, the base station 110 may determine a delay time to be 1 ms.

In operation 640, the base station 110 may schedule a connection time for the terminal 200 to connect to the base station 110, using the delay time determined in operation 620. Here, the scheduler 320 may set differing durations of time occupied by communication resources corresponding to the terminal 200, based on the terminal group including the terminal 200, and schedule the connection time of the terminal 200.

In operation 650, the base station 110 may transmit, to the terminal 200, scheduling information resulting from the scheduling in operation 640.

In operation 660, the terminal 200 may be connected to the base station 110, based on the scheduling information received in operation 650.

In operation 670, the base station 110 may perform wireless communication with the terminal 200 connected to in operation 660.

Figure 7:
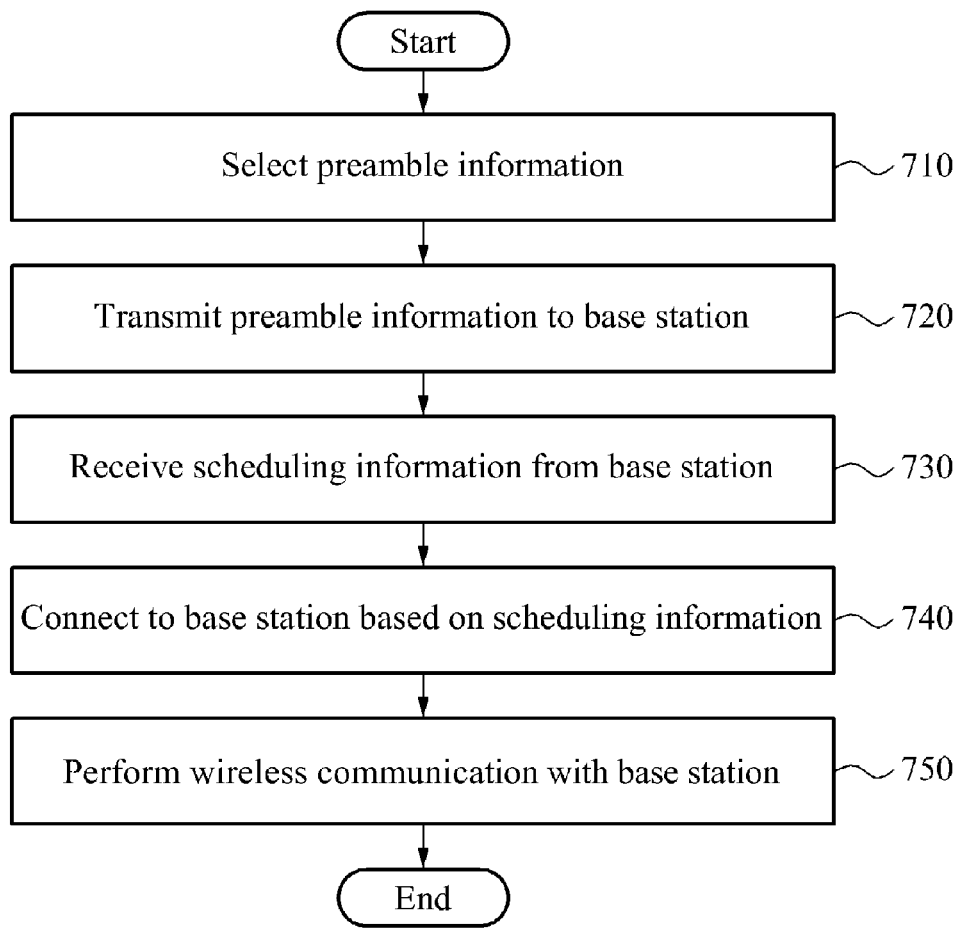
FIG. 7 is a flowchart illustrating a method for operating a terminal according to an embodiment of the present invention.

FIG. 7 is a flowchart illustrating a method for operating a terminal according to an embodiment of the present invention.

In operation 710, the preamble information selector 220 may select preamble information, based on location information of the terminal 200 obtained by the location information obtaining unit 210.

In this instance, the preamble information selector 220 may identify a terminal group corresponding to the terminal 200, based on the location information of the terminal 200, and select a single piece of preamble information from among preamble information corresponding to the identified terminal group.

More particularly, the preamble information selector 220 may identify a distance between the terminal 200 and the base station 110, based on the location information of the terminal 200, and identify a delay time occurring during communication between the terminal 200 and the base station 110, based on the location information of the terminal 200. The preamble information selector 220 may identify the terminal group corresponding to the terminal 200, using the identified delay time.

In operation 720, the transceiver 230 may transmit the preamble information selected in operation 710 to the base station 110.

In operation 730, the transceiver 230 may receive, from the base station 110, scheduling information corresponding to the preamble information transmitted in operation 720. Here, the scheduling information received by the transceiver 230 may refer to scheduling information based on the delay time occurring during the communication between the terminal 200 and the base station 110.

In operation 740, the transceiver 230 may connect to the base station 110, based on the scheduling information received in operation 730.

In operation 750, the transceiver 230 may perform wireless communication with the base station 110 connected to in operation 740.

Figure 8:
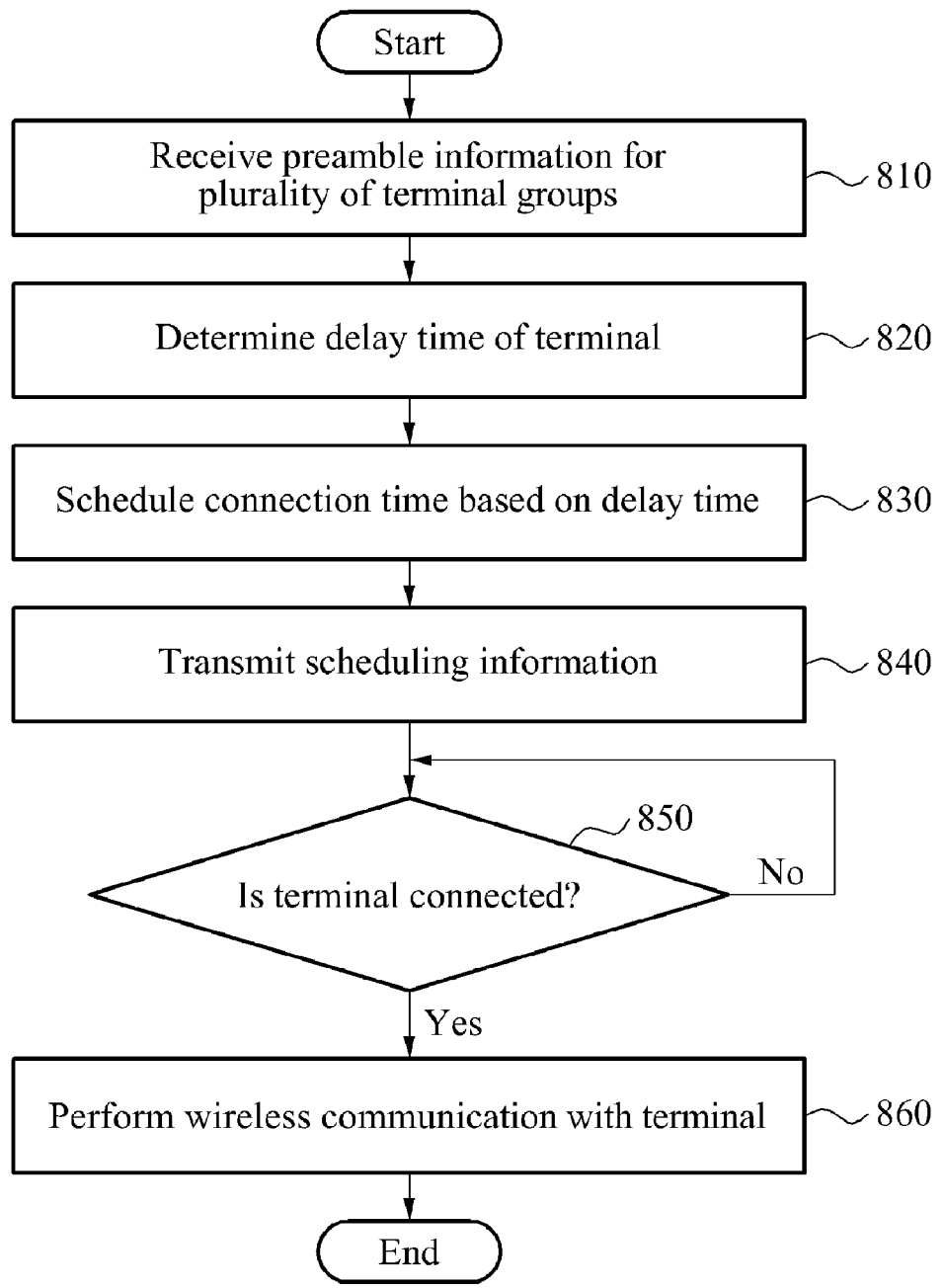
FIG. 8 is a flowchart illustrating a method for operating a base station according to an embodiment of the present invention.

FIG. 8 is a flowchart illustrating a method for operating a base station according to an embodiment of the present invention.

In operation 810, the transceiver 330 may receive, from the terminal 200, preamble information for a plurality of terminal groups based on location information of the terminals 200.

In operation 820, the delay time determiner 310 may determine a delay time of the terminal 200, based on the preamble information received in operation 810. More particularly, the delay time determiner 310 may identify a terminal group corresponding to the preamble information received in operation 810, and identify a delay time corresponding to the identified terminal group.

For example, when the preamble information for the plurality of terminal groups is established as shown in Table 1, and the transceiver 330 receives one of random access preamble codes from 17 through 32 as preamble information, the delay time determiner 310 may determine a delay time to be 1 ms.

In operation 830, the scheduler 320 may schedule a connection time for the terminal 200 to connect to the base station 110, using the delay time determined in operation 820.

In this instance, the scheduler 320 may schedule the connection time of the terminal 200, through setting differing durations of time occupied by communication resources corresponding to the terminal 200, based on a terminal group including the terminal 200. Also, the scheduler 320 may set, in proportion to a delay time, a duration of time occupied by communication resources corresponding to the terminal 200. The scheduler 320 may allocate identical communication resources to a plurality of terminals for which respective delay times differ from one another.

In operation 840, the transceiver 330 may transmit, to the terminal 200, scheduling information resulting from the scheduling in operation 830.

In operation 850, the transceiver 330 may verify whether the terminal 200 is connected based on the scheduling information transmitted in operation 840. When the terminal 200 is verified not to be connected, the transceiver 330 may stand by until the terminal 200 is connected.

When the terminal 200 is verified to be connected, the transceiver 330 may perform wireless communication with the terminal 200 in operation 860.

According to an aspect of the present invention, it is possible to compensate for an occurrence of a longer period of delay time than a random access slot length through scheduling a connection time of a terminal based on delay time information of the terminal.

According to another aspect of the present invention, it is possible to perform random access in a wide cell without increasing a random access slot length through scheduling a connection time of a terminal based on delay time information of the terminal.

According to an embodiment of the present invention, it is possible to compensate for an occurrence of a longer period of a delay time than a random access slot length through scheduling a base station scheduling a connection time of a terminal based on delay time information of the terminal.

According to another embodiment of the present invention, it is possible to perform random access in a wide cell without increasing a random access slot length through scheduling a connection time of a terminal based on delay time information of the terminal.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A base station comprising:
   a delay time determiner to determine a delay time of a terminal, using preamble information for a plurality of terminal groups based on information associated with a terminal location, wherein the delay time determiner receives the preamble information from the terminal, identifies a terminal group that corresponds to the preamble information, and identifies a delay time that corresponds to the terminal group as the delay time of the terminal;
   a scheduler to schedule a connection time for the terminal to connect to a base station, using the delay time; and
   a transceiver to transmit scheduling information comprising the scheduling to the terminal.

2. The base station of claim 1, wherein a terminal of the plurality of terminal groups is grouped based on a delay time related to a distance between the base station and the terminal of the plurality of terminal groups.

3. The base station of claim 1, wherein the connection time is scheduled through setting differing durations of time occupied by communication resources corresponding to the terminal, based on a terminal group including the terminal.

4. The base station of claim 1, wherein the scheduler sets, in proportion to the delay time, a duration of time occupied by communication resources corresponding to the terminal.

5. The base station of claim 1, wherein the scheduler allocates identical communication resources to a plurality of terminals for which respective delay times differ from one another.

6. A terminal comprising:
   a preamble information selector to select preamble information, using information associated with a terminal location, wherein the preamble information selector identifies a delay time of the terminal based on information associated with a location of the terminal, identifies a terminal group corresponding to the terminal based on the delay time, and selects the preamble information corresponding to the terminal group; and
   a transceiver to transmit the preamble information to a base station, and receive scheduling information corresponding to the preamble information from the base station, wherein the scheduling information comprises a connection time for the terminal to connect to the base station.

7. The terminal of claim 6, wherein the delay time occurs during communication between the terminal and the base station, and the preamble information selector identities the delay time using a distance between the terminal and the base station based on the information associated with the terminal location.

8. The terminal of claim 6, wherein a terminal of the terminal group is grouped based on a delay time related to a distance between the base station and the terminal of the terminal group.

9. The terminal of claim 6, wherein the transceiver performs wireless communication through connecting to the base station, based on the scheduling information.

10. A method for wireless communication, the method comprising:
    determining a delay time of a terminal, using preamble information for a plurality of terminal groups based on information associated with a terminal location, wherein determining the delay time comprises:
        receiving the preamble information from the terminal,
        identifying a terminal group that corresponds to the preamble information, and
        identifying a delay time that corresponds to the terminal group as the delay time of the terminal;
    scheduling a connection time for the terminal to connect to a base station, using the delay time; and
    transmitting scheduling information comprising the scheduling to the terminal.

11. The method of claim 10, wherein a terminal of the plurality of terminal groups is grouped based on a delay time related to a distance between the base station and the terminal of the plurality of terminal groups.

12. The method of claim 10, wherein the scheduling comprises:
    setting differing durations of time occupied by communication resources corresponding to the terminal based on a terminal group including the terminal.

13. The method of claim 10, wherein the scheduling comprises:
    setting, in proportion to the delay time, a duration of time occupied by communication resources corresponding to the terminal.

14. The method of claim 10, wherein the scheduling comprises:
    allocating identical communication resources to a plurality of terminals for which respective delay times differ from one another.

15. A method for wireless communication, the method comprising:
    identifying a delay time of a terminal based on information associated with a location of the terminal;
    identifying a terminal group corresponding to the terminal based on the delay time;
    selecting preamble information corresponding to the terminal group, using information on the location of the terminal; and
    transmitting the preamble information, and receiving scheduling information corresponding to the preamble information from the base station, wherein the scheduling information comprises a connection time for the terminal to connect to the base station.

16. The method of claim 15, wherein the
    delay time occurs during communication between the terminal and the base station, and identifying the delay time comprises using a distance between the terminal and the base station based on the information associated with the location of the terminal.

17. The method of claim 15, wherein a terminal of the terminal group is grouped based on a delay time related to a distance between the base station and the terminal of the terminal group.

18. The method of claim 15, further comprising:
    performing wireless communication through connecting to the base station, based on the scheduling information.

* * * * *